US009051797B2

(12) United States Patent
Rankin

(10) Patent No.: US 9,051,797 B2
(45) Date of Patent: Jun. 9, 2015

(54) APPARATUS AND METHOD FOR DISPENSING CHEMICALS INTO A WELL

(71) Applicant: Annular Cleaning Systems, LLC, Conroe, TX (US)

(72) Inventor: E. Edward Rankin, Grandbury, TX (US)

(73) Assignee: Annular Cleaning Systems, LLC, Conroe, TX (US)

( * ) Notice: Subject to any disclaimer, the term of this patent is extended or adjusted under 35 U.S.C. 154(b) by 427 days.

(21) Appl. No.: 13/692,504

(22) Filed: Dec. 3, 2012

(65) Prior Publication Data

US 2013/0140030 A1    Jun. 6, 2013

Related U.S. Application Data

(60) Provisional application No. 61/565,834, filed on Dec. 1, 2011.

(51) Int. Cl.
*E21B 27/00* (2006.01)
*E21B 43/16* (2006.01)
*C09K 8/92* (2006.01)

(52) U.S. Cl.
CPC .............. *E21B 27/00* (2013.01); *E21B 43/16* (2013.01); *C09K 8/92* (2013.01)

(58) Field of Classification Search
CPC ......... E21B 27/00; E21B 43/16; C09K 8/516; C09K 8/536; C09K 8/92
USPC .................................. 166/117, 162, 193, 279
See application file for complete search history.

(56) References Cited

U.S. PATENT DOCUMENTS

| 2,755,206 | A | * | 7/1956 | Statia, Sr. ...................... 131/337 |
| 4,721,159 | A | * | 1/1988 | Ohkochi et al. ............... 166/286 |
| 5,253,709 | A | | 10/1993 | Kendrick et al. |
| 5,254,379 | A | * | 10/1993 | Kotsiopoulos et al. ...... 428/35.7 |
| 6,794,340 | B2 | * | 9/2004 | Nguyen et al. ................. 507/110 |
| 2005/0167104 | A1 | * | 8/2005 | Roddy et al. ................... 166/279 |
| 2008/0108524 | A1 | * | 5/2008 | Willberg et al. ............... 507/225 |
| 2010/0307744 | A1 | | 12/2010 | Cochet et al. |
| 2011/0048711 | A1 | | 3/2011 | Lewis et al. |
| 2011/0195875 | A1 | | 8/2011 | Swearingen et al. |
| 2011/0237465 | A1 | | 9/2011 | Lee et al. |
| 2012/0285695 | A1 | * | 11/2012 | Lafferty et al. ............... 166/310 |
| 2013/0140030 | A1 | * | 6/2013 | Rankin ....................... 166/305.1 |

OTHER PUBLICATIONS

PCT Search Report and Written Opinion (PCT/US12/67566), dated Mar. 15, 2013.

* cited by examiner

*Primary Examiner* — Daniel P Stephenson
(74) *Attorney, Agent, or Firm* — John Timothy Headley

(57) ABSTRACT

A well chemical dispensing system includes a tubular sub for securing into a drill string. A ball stop is located within the passage. A ball filled with a liquid surfactant is pumped down the well. The ball is formed of a frangible material for shattering on impact with the ball stop, so as to dispense the surfactant, causing foaming when mixing with well fluid. Struts within the ball extend across an interior of the ball and join to inner surfaces of the ball. The struts are formed of a solid surfactant material. The ball has a spherical shape with dimples formed in an exterior surface of the sphere. A spring in the passage applies an upward force on the ball stop. The ball stop has upper and lower grids extending across the passage.

10 Claims, 4 Drawing Sheets

APPARATUS AND METHOD FOR DISPENSING CHEMICALS INTO A WELL

CROSS-REFERENCE TO RELATED APPLICATION

This application claims priority to provisional patent application 61/565,834, filed Dec. 1, 2011.

FIELD OF THE DISCLOSURE

This invention relates in general to chemical injection and, in particular, to a surfactant deployment system for improved surfactant delivery during drilling and hydraulic fracturing operations.

BACKGROUND OF THE DISCLOSURE

In typical oil and gas well drilling, a drill bit is secured to the lower end of a drill string and lowered into the well. The drill bit is rotated by the drill string, by a downhole drilling fluid motor, or both. The operator pumps drilling fluid down the drill string, which passes through nozzles in the drill bit and flows back up an annulus surrounding the drill string.

In some earth formations, horizontal wells are drilled. The well has a vertical portion that forms a gradual bend with a horizontal portion. Earth formation cuttings tend to build up in certain parts of a horizontal well. The build up of cuttings slows the rate of penetration of the drift bit. Also, the build up can cause the drill string to become stuck.

Surfactants are used in oil and gas well production operations for various purposes. Some surfactants will foam when mixed with well fluid. However, foaming type surfactants are not generally pumped along with the drilling fluid because the foaming would occur within the drill pipe and render the pumping more difficult.

SUMMARY

The apparatus of this invention includes a hollow container adapted to be pumped down the well. The container is filled with a chemical. The container is formed of a frangible material for shattering on impact with a structure in the well, so as to dispense the chemical for mixing with well fluid.

Struts within the container extend across an interior of the container and join to inner surfaces of the container. The struts may be formed of a solid form of the chemical. The container preferably is in a shape of a sphere having dimples formed in an exterior surface of the sphere.

The apparatus also includes a sub adapted to be secured into a drill string. The sub has a passage extending therethrough for transmitting drilling fluid pumped down the drill string. The container is adapted to be pumped down the drill string along with the drilling fluid. A container stop is located within the passage for serving as the structure on which the container impacts and shatters. The container stop has at least one opening therethrough for the passage of drilling fluid. The container stop comprises at least one sharp, upward-facing edge for contact with the container. A spring located in the passage biases the container stop upward, the spring being contractible upon the container striking the container stop.

The container stop sub preferably includes an upper grid extending across the passage for serving as the structure on which the container impacts and shatters. A lower grid extends across the passage below the upper grid for comminuting pieces of the container falling through the upper grid into smaller dimensions.

BRIEF DESCRIPTION OF THE DRAWINGS

So that the manner in which the features, advantages and objects of the invention, as well as others which will become apparent, are attained, and can be understood in more detail, more particular description of the invention briefly summarized above may be had by reference to the embodiments thereof which are illustrated in the appended drawings that form a part of this specification. It is to be noted, however, that the drawings illustrate only a preferred embodiment of the invention and are therefore not to be considered limiting of its scope as the invention may admit to other equally effective embodiments.

DETAILED DESCRIPTION

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

In the following discussion, numerous specific details are set forth to provide a thorough understanding of the present invention. However, it will be obvious to those skilled in the art that the present invention may be practiced without such specific details. Additionally, for the most part, details concerning well drilling, rig operation, well completion, and the like have been omitted inasmuch as such details are not considered necessary to obtain a complete understanding of the present invention, and are considered to be within the skills of persons skilled in the relevant art.

Figure 1A:
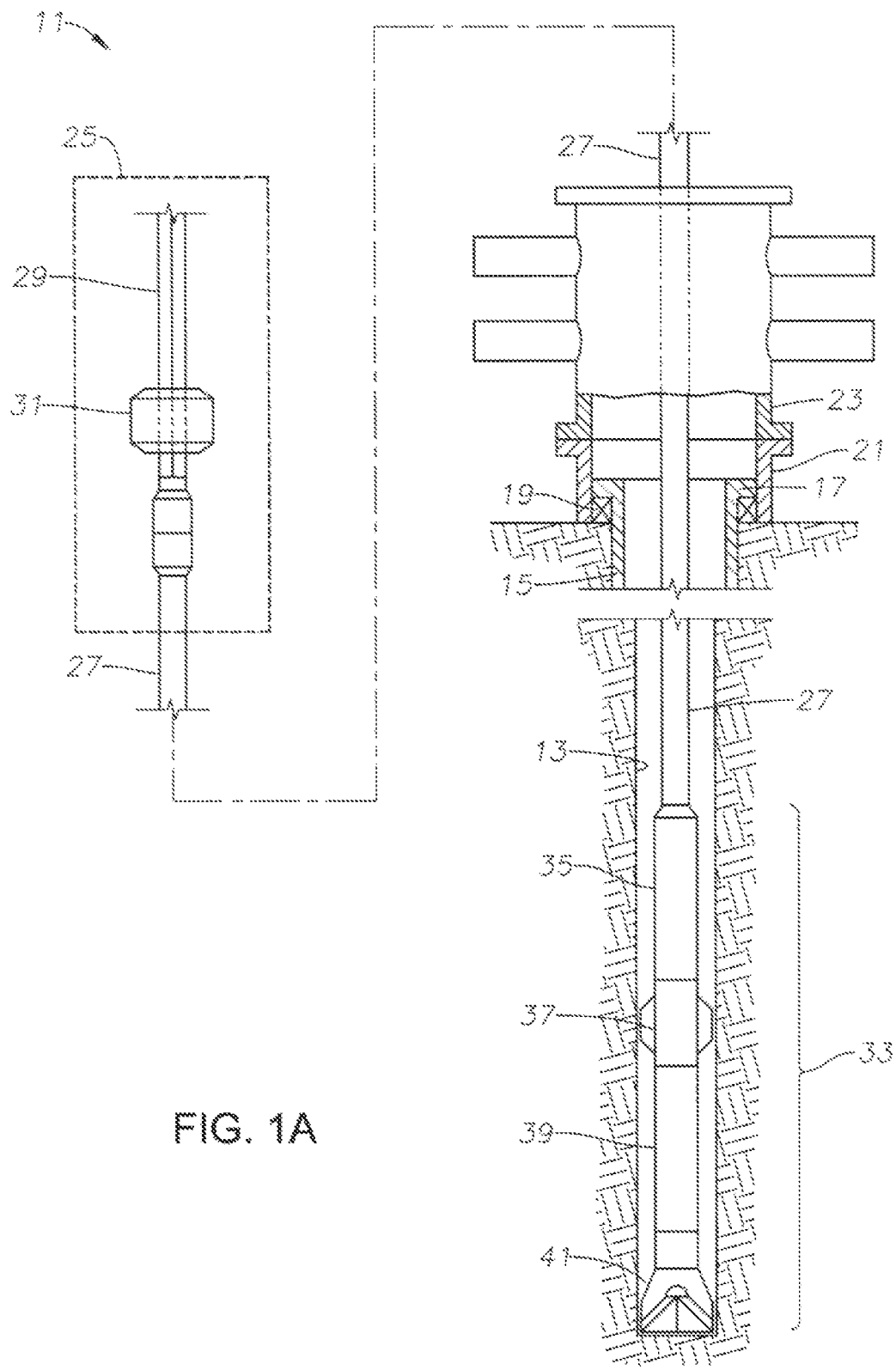
FIGS. 1A-1B are a schematic representation of a drilling system in accordance with an embodiment of the present invention.

Referring to FIG. 1A, a portion of a wellbore drilling system 11 is employed in this example to drill a wellbore 13. Wellbore 13 includes a casing 15 that extends a distance into wellbore 13. In the illustrated embodiment, casing 15, the well is being drilled to a greater depth below casing 15. Casing 15 is supported at the surface by a casing hanger 17 and seal 19. Casing hanger 17 and seal 19 engage a wellhead member 21 located at the surface. A blowout preventer 23 may be disposed on wellhead member 21. A drilling rig 25 is disposed over blowout preventer 23. In another embodiment, blowout preventer 23 may be disposed on drilling rig 25. Drilling rig 25 may support a drill string 27 through use of a top drive (not shown) and/or kelly 29 and kelly bushing 31.

A bottom hole assembly 33 may be disposed on drill string 27 within wellbore 13 proximate to the bottom of wellbore 13. Bottom hole assembly 33 may include several drill collars 35 (only one shown), a near bit stabilizer 37, a ball stop sub 39, aid a drill bit 41. Drill collar 35 may be coupled to an end of drill string 27 and provide a coupling apparatus for near bit stabilizer 37. Near bit stabilizer 37 may couple to drill collar 35 opposite of drill string 27 and mechanically stabilize bottom hole assembly 33 within wellbore 13 during drilling operations. Ball stop assembly 39 may couple to near bit stabilizer 37 opposite the lowest drill collar 35 and operate to fracture chemical-filled containers or balls 43 (FIGS. 3A-3C) as described in more detail below. Drill bit 41 may secure to ball stop assembly 39 opposite near bit stabilizer 37 and operate in response to rotation of drill string 27 to increase the depth of wellbore 13.

Figure 1B:
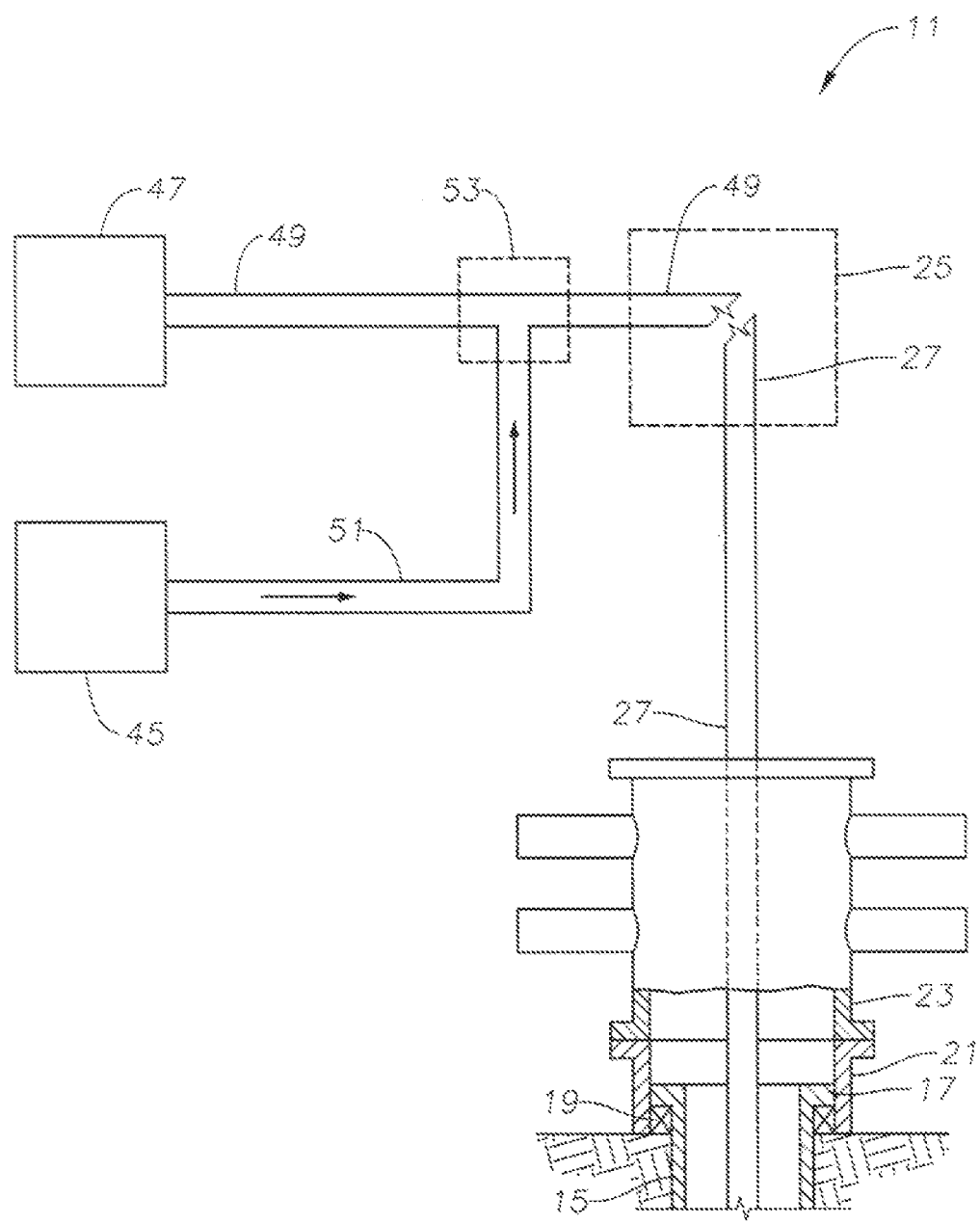

Referring to FIG. 1B, wellbore drilling system 11 also includes a surfactant ball control unit 45 and pumps 47, both located in or near drilling rig 25. Pumps 47 may be in fluid communication with drill string 27, represented by a pump discharge line 49, so that pumps 47 may operate to pump a drilling fluid down drill string 27 to drill bit 41. Drilling fluid provides hydrostatic pressure to prevent formation fluids from entering into wellbore 13, keeps drill bit 41 cool and clean during drilling, and carries out drill cuttings. Drilling fluid may carry chemicals injected into the well, and it carries balls 43 (FIGS. 3A-3C) to ball stop sub 39 in drill string 27.

Surfactant ball control unit 45 is in fluid communication with pump discharge line 49 through a surfactant ball discharge line 51 on an surfactant ball injection skid 53. Surfactant ball discharge line 51 allows for delivery of surfactant balls 43 to pump discharge line 49, where surfactant balls 43 may be pumped into drill string 27. Surfactant ball control unit 45 comprises an automated unit capable of controlling flow of surfactant balls 43 into drill string 27. For example, surfactant ball control unit 45 may comprise an automated controller capable of receiving input from an operator to, in turn, operate valves along surfactant ball discharge line 51 to release surfactant balls 43 into pump discharge line 49. Surfactant ball control unit 45 may include a pump or pumps to pump surfactant balls 43 into pump discharge line 49.

Figure 2A:
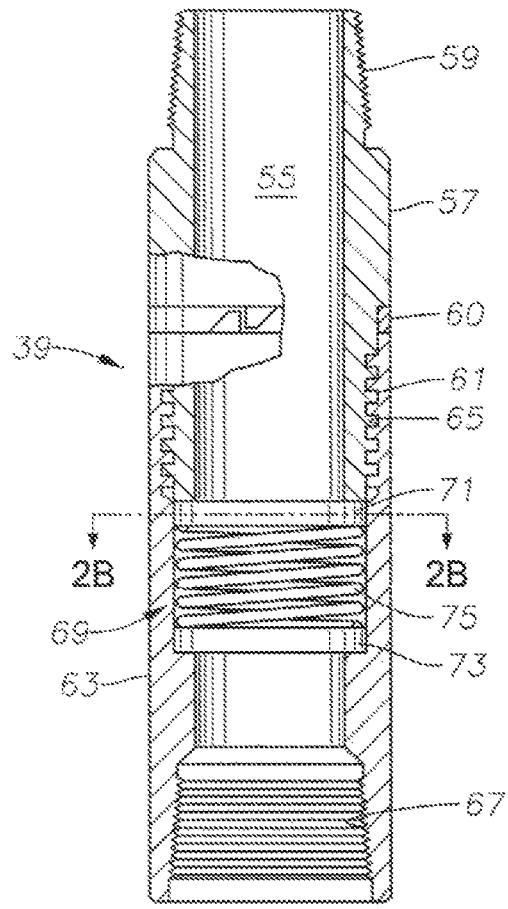
FIG. 2A is a schematic representations of a ball stop sub of the drilling system of FIGS. 1A-1B.

Referring to FIG. 2A, ball stop sub 39 is a tubular member having an axially extending passage 55. Ball stop sub 39 includes a tabular upper portion 57 having external threads 59 and a lower set of threads 61. Lower threads 61 couple to a tubular lower portion 63 of ball stop sub 39. Lower portion 63 includes internal threads 65 that couple to threads 61 such that during rotation of drill string 27 and, consequently upper portion 57, lower portion 63 may not decouple from upper portion 57. A lock ring 60 may further secure lower portion 63 to upper portion 57. Lower portion 63 also includes a lower box connection 67 for threading to drill bit 41 (FIG. 1A).

A ball stop assembly 69 is positioned within lower portion 63. Ball stop assembly 69 includes an upper grid 71, a lower grid 73, and a spring member 75 interposed between upper grid 71 and lower grid 73. Spring member 75 exerts an upward force on upper grid 71 to dampen the impact of balls 43 (FIGS. 3A-3C) landing on upper grid 71.

Figure 2B:
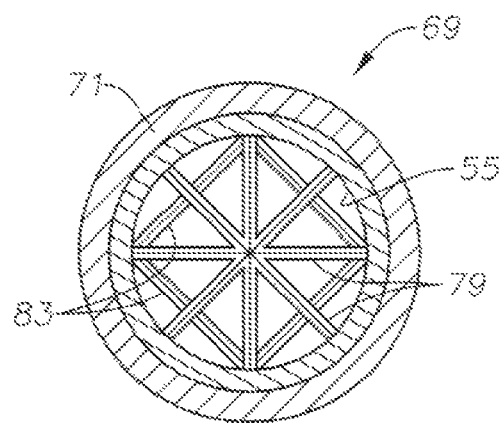
FIG. 2B is a sectional view of the ball stop sub of FIG. 2A, taken along the tine 2B-2B of FIG. 2A.

As shown in FIG. 2B, upper grid 71 extends across axial passage 55 and comprises a plurality of blades 79. Blades 79 are spaced apart from each other to permit fluid flow down axial passage 55 through upper grid 71. The spacing between blades 79 is smaller than balls 43 (FIGS. 3A-3C) to stop further downward movement of balls 43. Blades 79 are configured to cause balls 43 to shatter into small pieces upon impact. For example, each blade 79 may include an upward-facing edge portion that is formed into a cutting surface so that the edge may penetrate and shatter balls 43. In the example of FIG. 2B, upper grid 71 comprises four blades 79, each extending across the inner diameter of ball stop assembly 69. Blades 79 form eight pie-shaped openings through upper grid 71. In the illustrated embodiment, blades 79 intersect each other on the axis of upper grid 71 and are evenly spaced around an inner circumference of upper grid 71. Thus, a distance between adjacent blades 79 increases in a radially outward direction from the axis of upper grid 71. Other arrangements of blades 79 are feasible.

Lower grid 73 also has a plurality of blades 83 extending across central passage 55. Similar to upper grid 71, blades 83 of lower grid 73 are spaced to permit downward fluid flow through axial passage 55. In the illustrated embodiment, blades 83 are chords of lower grid 73, having lengths less than an inner diameter of lower grid 73. The arrangement of blades 83 forms a diamond-shaped pattern. Blades 83 may also include an upper edge formed into a cutting surface, similar to upper blades 79. Lower blades 83 are oriented offset from upper blades 79 such that a vertical plane extending through one of the blades 79 does not also extend through one of the blades 83. Blades 83 of lower grid 73 may be disposed so that blades 83 are positioned beneath areas of larger separation between blades 79, so that a fragment of a shattered ball 43 (FIG. 3A-3C) dropping below blades 79 may impact blades 83 to comminute or further break up fragments. Other patterns for blades 83 are feasible. Upper and lower grids 71, 73 are passive and rotate with drill string 27 (FIG. 1A).

Figure 3A:
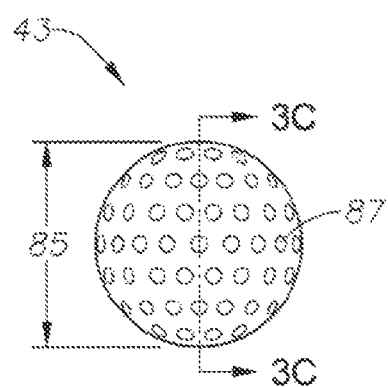
FIG. 3A is a side view of a ball containing a surfactant for pumping down the drill string of FIG. 1.

Referring to FIG. 3A, surfactant ball or container 43 is shown. Surfactant ball 43 is a hollow, generally spherical shaped container, but other shapes are feasible. Surfactant ball 43 is formed of brittle, frangible material, such as a polyethylene terephthalate, "PET", glass, or similar substance. Surfactant ball 43 has a diameter 85, which may be may be approximately 1" to 2', for example, but can vary. An exterior surface of surfactant ball 43 may include a plurality of dimples 87. Dimples 87 cause the boundary layer on the upstream side of the ball to transition from laminar to turbulent. The turbulent boundary layer is able to remain attached to the surface of the ball much longer than a laminar boundary layer, thereby creating a narrower, low pressure wake and less pressure drag. The manipulation of the boundary layer by dimples 87 may assist in maintaining surfactant ball 43 in a center of drill string 27 as surfactant ball 43 is pumped to the subsurface location. In the illustrated embodiment, surfactant ball 43 includes approximately 388 dimples 87. A person skilled in the art will understand that any suitable number of dimples 87 may be used provided that dimples 87 are substantially evenly spaced around the surface of surfactant ball 43. The surface of surfactant ball 43 may be coated with a substance, such as fluoropolymer of tetrafluoroethylene like Teflon or the like, adapted to reduce friction between adjacent containers and protect surfactant balls 43 from chemicals that may be suspended within the drilling fluid.

Figure 3B:
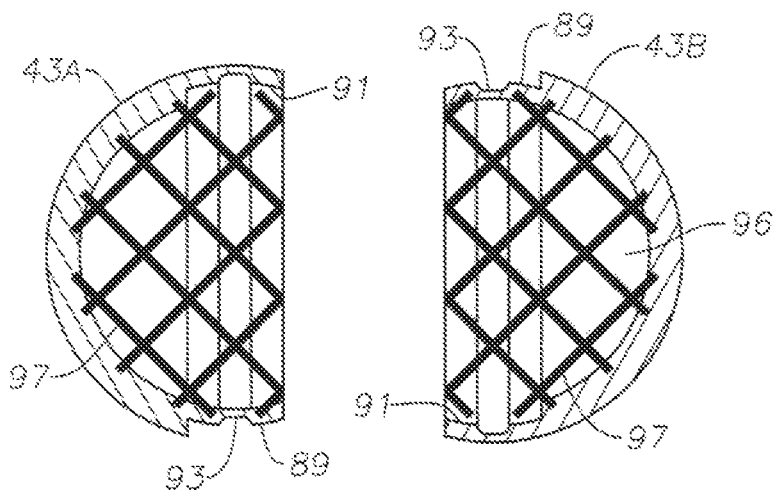
FIG. 3B is a sectional and exploded view of the ball of FIG. 3A.
Figure 3C:
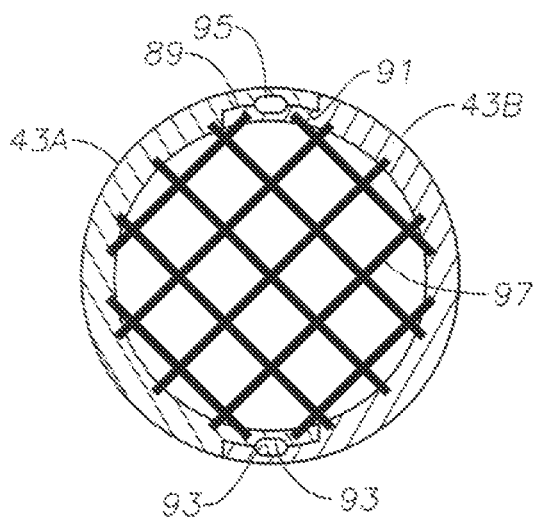
FIG. 3C is a sectional view of the ball of FIG. 3A, taken along the line 3C-3C of FIG. 3A.

Surfactant ball 43 may be formed in two semi-spheres 43A and 43B, illustrated in FIG. 3B. Each semi-sphere 43A and 43B will have mating recess 89, 91 at edges to each semi-sphere 43A and 43B. Recess 89 may fit into mating portion 91 along with an adhesive, such as a sealing compound to secure semi-sphere 43A to semi-sphere 43B as shown in FIG. 3C. Mating grooves 93 formed in mating recesses 89, 91 may be filled with the adhesive and will align to form an adhesive layer 95 sealing semi-sphere 43A to semi-sphere 43B. Once joined, the interior of ball 43 is sealed from the exterior.

Referring to FIGS. 3B and 3C, each surfactant ball 43 is filled with a liquid chemical, preferably a surfactant 96. Surfactant 96 may be a suitable soap-like product that foams when mixed with drilling fluid. Also, each surfactant ball 43 may have internal rods or struts 97 arranged to define a generally honeycomb matrix. Struts 97 may be formed of a solid surfactant, such as soap sticks. Struts 97 may structurally support surfactant ball 43 until surfactant ball 43 is shattered by impact with upper grid 71 (FIG. 2A). When surfactant balls 43 are shattered, struts 97 and surfactant ball 43 break into smaller pieces or fragments. The fragments will have a significantly smaller size than surfactant ball 43. For example, the fragments may have dimensions less than 0.007 of an inch.

Also, when ball 43 shatters, liquid surfactant 96 will be released into the drilling fluid, where it will be circulated through and around drill bit 41 along with the fragments. The mixing with drilling fluid will cause liquid surfactant 96 to foam and the fragments of struts 97 to foam. The resulting foam aids in the movement of drilling fluid through drill bit 41, helps to clean drill bit 41 during drilling operations, and facilitates the removal of earth formation cuttings from the annulus surrounding drill string 27. In addition, the surfactant may act as an additional lubricant for drill bit 41, allowing for longer life of drill bit 41.

In operation, surfactant balls 43 may be pumped down drill string 27 along with drilling fluid to ball stop sub 39. The operator may choose to dispense one or more balls 43 when the rate of penetration of drill bit 41 decreases or drill string 27 starts to stick. As shown in FIG. 2A, spring member 75 is initially in an uncompressed position so that upper grid 71 and lower grid 73 are at their maximum distances from one another. Surfactant ball 43 enters axial passage 55 of ball stop sub 39 and shatters upon impact with upper grid 71. The impact of surfactant ball 43 on upper grid 71 may exert a force on upper grid 71 that causes compression of spring member 75. Drilling fluid pressure applied to the drilling fluid in drill string 27 may also increase upon contact of ball 43 with upper grid 71, causing a compression of spring member 75. As surfactant ball 43 shatters, surfactant 96 (FIG. 3B) contained within surfactant ball 43 releases for distribution into the drilling fluid. If spring member 75 has deflected, it will return to an extended position after ball 43 shatters. Typically, the operator will release surfactant balls 43 one at a time, so only one ball 43 impacts on upper grid 71 at a time.

Figure 4:
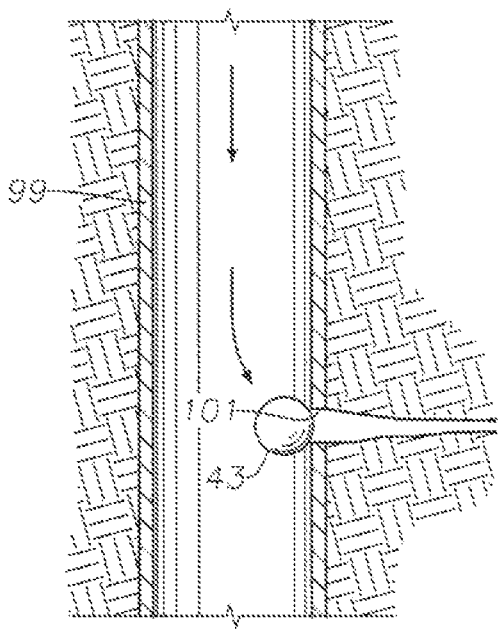
FIG. 4 is a schematic representations of the ball of FIGS. 3A-3C being used with a hydraulic fracturing operation.

In addition to drilling operations, chemical-filled balls 43 may also be employed in hydraulic fracturing operations, as illustrated in FIG. 4. Fracturing operations are normally performed on wells that are completed and have been fully cased, as indicated by casing 99. The operator will create one or more openings or perforations 101 in casing 99. The operator then pumps a fracturing fluid into casing 99 at a high pressure. The high pressure causes the earth formation to fracture, forming cracks that are then propped open with proppants mixed with the fracturing fluid. The proppants are small solid members, such as grains of sand.

In this embodiment, the operator also dispenses one or more chemical-filled balls 43 as the fracturing fluid is pumped down. Balls 43 are larger in diameter than perforations 101. Each ball 43 will tend to follow the fluid flow through perforations 101, but will impact against the portion of casing 99 surrounding perforation 101. The impact and high pressure cause ball 43 to rupture, dispensing a chemical into the earth formation. The chemical may be a liquid surfactant 96 (FIG. 3B), which foams to assist in the fracturing. Also, fragments of struts 97 (FIG. 3B) will flow through perforation 101 and foam when contacted by the fracturing fluid.

Accordingly, the disclosed embodiments provide numerous advantages. For example, the disclosed embodiments provide an apparatus that aids in fluid flow through a drill bit and up the annulus during drilling operations. In addition, the disclosed embodiments provide a system that aids in cleaning the drill bit during drilling operations, thereby allowing for longer use of the drill bit. The systems reduces the tendency for drill strings to stick, particularly while drilling horizontal wells in some formations. The frangible containers or balls delay contact of the surfactant therein with well fluids until reaching the desired place. The delay prevents the surfactant from foaming a long distance away from where it is needed, both in drilling and fracturing operations.

It is understood that the present invention may take many forms and embodiments. Accordingly, several variations may be made in the foregoing without departing from the spirit or scope of the disclosure. Having thus described the present disclosure by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the disclosure.

What is claimed is:

1. An apparatus for enhancing well construction, comprising:
   a sealed container filled with a chemical having a configuration for pumping down the well;
   the container being formed of a frangible material for shattering on impact with a structure in the well, so as to dispense the chemical for mixing with well fluid; and
   struts within the container extending across an interior of the container and joined to inner surfaces of the container.

2. The apparatus according to claim 1, wherein the struts are formed of a solid form of the chemical.

3. An apparatus for enhancing well construction, comprising:
   a sealed container filled with a chemical having a configuration for pumping down the well;
   the container being formed of a frangible material for shattering on impact with a structure in the well, so as to dispense the chemical for mixing with well fluid;
   a sub adapted to be secured into a drill string;
   the sub having a passage extending therethrough for transmitting drilling fluid pumped down the drill string;
   the container adapted to be pumped down the drill string along with the drilling fluid;
   a container stop located within the passage for serving as the structure on which the container impacts and shatters, the container stop having at least one opening therethrough for the passage of drilling fluid; and
   a spring located in the passage that biases the container stop upward, the spring being contractible upon the container striking the container stop.

4. An apparatus for enhancing well construction, comprising:
   a sealed container filled with a chemical having a configuration for pumping down the well;
   the container being formed of a frangible material for shattering on impact with a structure in the well, so as to dispense the chemical for mixing with well fluid;
   a sub adapted to be secured into a drill string;

the sub having a passage extending therethrough for transmitting drilling fluid pumped down the drill string;

the container adapted to be pumped down the drill string along with the drilling fluid;

an upper grid extending across the passage for serving as the structure on which the container impacts and shatters; and a lower grid extending across the passage below the upper grid for comminuting pieces of the container falling through the upper grid to smaller dimensions.

5. The apparatus according to claim 4, wherein:

each of the grids comprise a plurality of upward pointing sharp edges.

6. The apparatus according to claim 4, further comprising:

a spring mounted between the upper and the lower grids that urges the upper grid in an upward direction; and the spring being contractible in response to the container contacting the upper grid.

7. An apparatus for enhancing well drilling, comprising:

a tubular sub having an axis, an axially extending passage, and threaded upper and lower ends for securing into a drill string;

a container stop within the passage;

a hollow container adapted to be pumped down the well;

the container being filled with a liquid surfactant;

the container being formed of a frangible material for shattering on impact with the container stop, so as to dispense the surfactant, causing foaming when mixing with well fluid; and struts within the container extending across an interior of the container and joined to inner surfaces of the container.

8. An apparatus for enhancing well drilling, comprising:

a tubular sub haying an axis, an axially extending passage, and threaded upper and lower ends for securing into a drill string;

a container stop within the passage;

a hollow container adapted to be pumped down the well;

the container being filled with a liquid surfactant; and the container being formed of a frangible material for shattering on impact with the container stop, so as to dispense the surfactant, causing foaming when mixing with well fluid, wherein the container has struts formed of a solid surfactant material.

9. An apparatus for enhancing well drilling, comprising:

a tubular sub haying an axis, an axially extending passage, and threaded upper and lower ends for securing into a drill string;

a container stop within the passage;

a hollow container adapted to be pumped down the well;

the container being filled with a liquid surfactant;

the container being formed of a frangible material for shattering on impact with the container stop, so as to dispense the surfactant, causing foaming when mixing with well fluid; and a spring in the passage that applies an upward force on the container stop.

10. An apparatus for enhancing well drilling, comprising:

a tubular sub having an axis, an axially extending passage, and threaded upper and lower ends for securing into a drill string;

a container stop within the passage;

a hollow container adapted to be pumped down the well;

the container being filled with a liquid surfactant; and the container being formed of a frangible material for shattering on impact with the container stop, so as to dispense the surfactant, causing foaming when mixing with well fluid, wherein:

the container stop comprises an upper grid extending across the passage transverse to the axis, the upper grid having a plurality of blades; and the apparatus further comprises:

a lower grid having a plurality of blades spaced below the upper grid.

* * * * *